United States Patent
Wu (10) Patent No.: US 9,582,141 B2
(45) Date of Patent: Feb. 28, 2017

(54) THREE DIMENSIONAL USER INTERFACE FOR WATCH DEVICE

(71) Applicant: Sony Corporation, Minato-ku (JP)

(72) Inventor: Weiguo Wu, Beijing (CN)

(73) Assignee: SONY CORPORATION, Tokyo (JP)

(*) Notice: Subject to any disclaimer, the term of this patent is extended or adjusted under 35 U.S.C. 154(b) by 335 days.

(21) Appl. No.: 14/151,982

(22) Filed: Jan. 10, 2014

(65) Prior Publication Data

US 2014/0215406 A1    Jul. 31, 2014

(30) Foreign Application Priority Data

Jan. 31, 2013   (CN) .......................... 2013 1 0038392

(51) Int. Cl.
| | |
|---|---|
| *G06F 3/048* | (2013.01) |
| *G06F 3/0481* | (2013.01) |
| *G06F 1/16* | (2006.01) |
| *G06F 3/01* | (2006.01) |
| *G06F 3/03* | (2006.01) |
| *G06F 3/042* | (2006.01) |

(52) U.S. Cl.
CPC .......... *G06F 3/04815* (2013.01); *G06F 1/163* (2013.01); *G06F 3/017* (2013.01); *G06F 3/0304* (2013.01); *G06F 3/042* (2013.01)

(58) Field of Classification Search
None
See application file for complete search history.

(56) References Cited

U.S. PATENT DOCUMENTS

| | | | | |
|---|---|---|---|---|
| 2009/0231278 | A1* | 9/2009 | St. Hilaire | G06F 3/017 345/158 |
| 2010/0305418 | A1* | 12/2010 | Deliwala | A61B 5/14551 600/324 |
| 2012/0249475 | A1* | 10/2012 | Murphy | G06F 1/1694 345/174 |

* cited by examiner

*Primary Examiner* — William Trapanese
(74) *Attorney, Agent, or Firm* — Oblon, McClelland, Maier & Neustadt, L.L.P.

(57) ABSTRACT

The invention discloses a mobile terminal, comprising a display unit configured to display an image to be displayed in three-dimensional space beyond the mobile terminal, a determination module configured to determine an instruction input by a user through the displayed image via spatial position detection, and a processing module configured to execute an operation corresponding to the determined instruction. In the invention, both the display of the image in the three-dimensional space beyond the mobile terminal and the spatial position detection are beneficial to execute the operation corresponding to the instruction from the user accurately, so that the user can observe the image conveniently, the limitation of a screen size is eliminated, the instruction from the user can be judged and executed accurately, and user experience is improved.

18 Claims, 4 Drawing Sheets

THREE DIMENSIONAL USER INTERFACE FOR WATCH DEVICE

FIELD OF THE INVENTION

The disclosure relates to the mobile terminal field, more particularly to a mobile terminal.

BACKGROUND OF THE INVENTION

Birth of smart phones and input of various smart phones with Android operating system and a Window operating system into the market change people's lift-style greatly and impact on the society significantly. The utilization of the smart phones can help people to acquire favorite contents anywhere, search needed information, send messages to friends or strangers through social networking services therein or communicate with each other in other ways.

With the development of the smart phones, many portable mobile terminals are also be developed to the high intelligentization. For example, the existing portable smart devices, such as tablet PCs, personal digital assistant (PDA), smart watches, navigation devices, multimedia players (including a picture player, an audio player, a video player, a text player, a game machine, etc.) and the like are also equipped with sufficient functions and maximize conveniences for the people.

However, because of inconvenience to take and easiness to damage or lose many portable mobile terminals such as the smart phones and the tablet PCs caused by external factors, these mobile terminals are not applicable to congested or movable environments.

At present, a scheme on wearable mobile terminals is proposed in order to break a restriction of the 'handheld' smart devices. However, screen sizes of the wearable mobile terminals are limited. The sizes of the mobile terminals are too large to take conveniently while too small to operate easily.

No effective solution to address the issue that it is difficult to balance between taking and operating the mobile terminals due to restriction of the screen sizes thereof is developed.

DESCRIPTION OF THE INVENTION

Concerning the issue that it is difficult to balance between taking and operating the mobile terminals due to restriction of the screen sizes thereof, the disclosure provides a mobile terminal, which can achieve images displaying in space beyond the mobile terminal, thereby breaking the restriction of the screen sizes thereof with the effects of convenience to watch the images for users, exact judgment and execution of users' instructions and improvement of user experience.

The technical solution of the disclosure is such implemented that:

A mobile terminal is provided according to one aspect of the disclosure, comprising:

A display unit configured to display an image to be displayed in three-dimensional (3D) space beyond the mobile terminal;

A determination module configured to determine an instruction input by a user in accordance with the displayed image through spatial position detection; and A processing module configured to execute an operation corresponding to the determined instruction.

A watch-type mobile terminal is provided according to another aspect of the disclosure, comprising a main body and a fixing band, wherein the main body comprises a display unit configured to display an image to be displayed in a 3D space beyond the mobile terminal; a determination module configured to determine an instruction input by a user by the displayed image through spatial position detection; and a processing module configured to execute an operation corresponding to the determined instruction; and the fixing band is connected with the main body to wear the mobile terminal by a user.

Also, the fixing band is internally equipped with batteries for supplying power for the watch-type mobile terminal, the batteries connected with the main body.

A non-transient storage medium is provided according to another aspect of the disclosure, having embodied thereon a computer program configured to make a processor to execute an operation according to an instruction input by a user through the displayed image, the computer program comprising code segments configured to cause a processor to: determining an instruction input by the user through the displayed image via spatial position detection, wherein the image is displayed in a three-dimensional space beyond the mobile terminal; and executing an operation corresponding to the determined instruction.

In the disclosure, both displaying the image in the 3D space beyond the mobile terminal and the spatial position detection are beneficial to exactly execute the operation corresponding to the user's instruction, thus being convenient to watch the image for the user, breaking the restriction of the screen sizes thereof, exactly judging and executing the user's instruction, and improving the user experience.

BRIEF DESCRIPTION OF THE DRAWINGS

The following description to figures in the embodiments is made to illustrate the embodiments of the disclosure or the technical solution in the prior art clearly. Obviously, the following figures are illustrative of some embodiments of the disclosure merely. A person skilled in the art may obtain other figures without creative works according to these figures.

DETAILED DESCRIPTION OF ILLUSTRATIVE EMBODIMENTS

The technical solutions of the embodiments of the disclosure will be described clearly and completely in conjunction with the figures herein. Obviously, the described embodiments are a part of the embodiments of the disclosure. A person skilled in the art can obtain other embodiments within the scope of the disclosure based on the embodiments herein.

A mobile terminal is provided according to embodiments of the disclosure.

Figure 1:
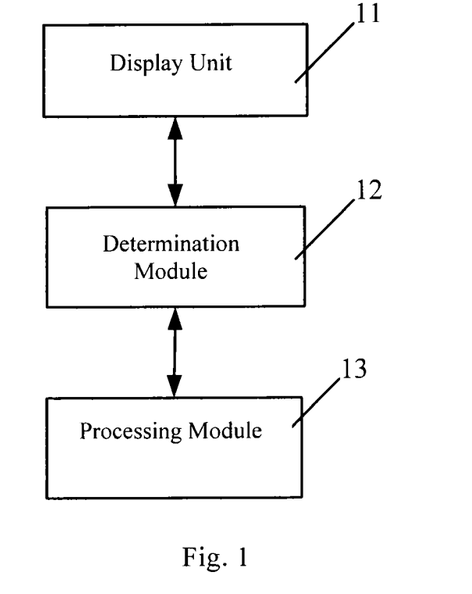
FIG. 1 is a block diagram of a mobile terminal according to embodiments of the disclosure.

FIG. 1 illustrates a mobile terminal according to an embodiment of the disclosure, comprising:

A display unit 11 configured to display an image to be displayed in 3D space beyond the mobile terminal;

A determination module 12 configured to determine an instruction input by a user in accordance with the displayed image through spatial position detection; and A processing module 13 configured to execute an operation corresponding to the determined instruction.

Wherein the display unit 11 may display the image by Light Re-construction Technology (also referred to as Light Field Technology) or other technologies.

Also, the image displayed by the display unit 11 may be a preset-shaped planar interface and/or a preset-shaped solid graphical interface.

In a circumstance that the displayed image is the preset-shaped planar interface, if a target page to be displayed is determined in accordance with the instruction input by the user, the target page is displayed in the planar interface.

The target page to be displayed is determined in accordance with the instruction input by the user in the operation of the mobile terminal according to the embodiments of the disclosure, wherein the manners to input the instruction by the user include, but not limited to, a point touch manner and a sliding manner. Moreover, the image displayed by the mobile terminal according to the embodiments of the disclosure can be subjected to different operations such as point touch, sliding and the like by a hand (for example, fingers) or a touch pen and the like. The description is made with reference to the operation implemented by the user's fingers, and the technical solutions covered in the disclosure are also applicable to the operations implemented by the user in other manners.

Figure 2:
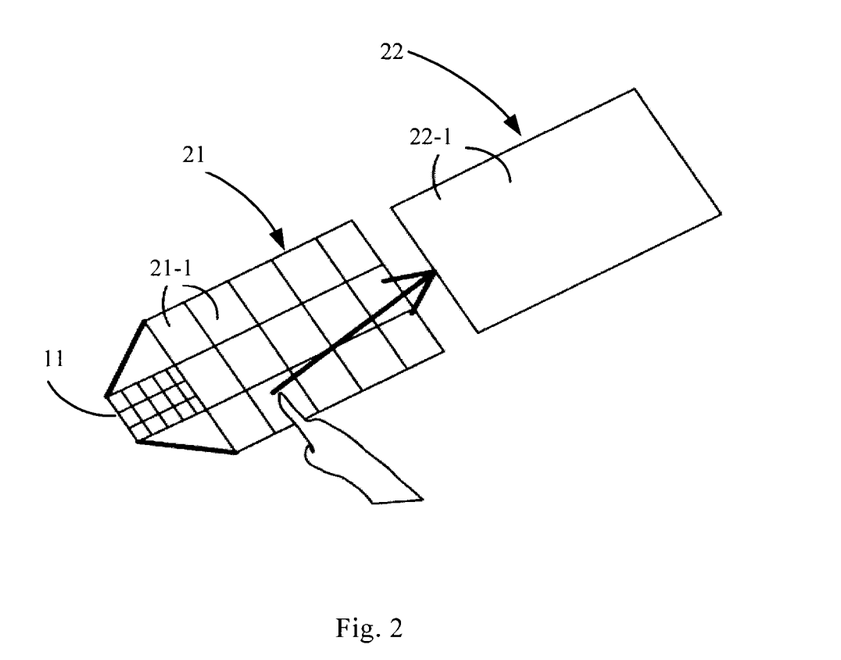
FIG. 2 is a schematic diagram of detecting an instruction input in a point touch manner by a user and displaying a target page by a mobile terminal according to embodiments of the disclosure.

In FIG. 2, the display unit 11 may display a primary menu 21 including a plurality of icons 21-1 (only two icons are illustrated in FIG. 2 for clarity) in the planar interface in an embodiment. When one icon in the primary menu 21 displayed by the display unit 11 is operated by the user's finger in a point touch manner, the mobile terminal can determine positions touched by the user's finger to further determine the icon operated by the user's finger (an executed operation); accordingly a secondary menu 22 is displayed in the planar interface. The secondary menu 22 can also include a plurality of icons, an entire picture, and combination thereof although not shown in FIG. 2. The secondary menu 22 may be a game picture and also an interface where a picture, a webpage, texts, a clock page, a navigation map and other applications to be browsed are operated.

Figure 3:
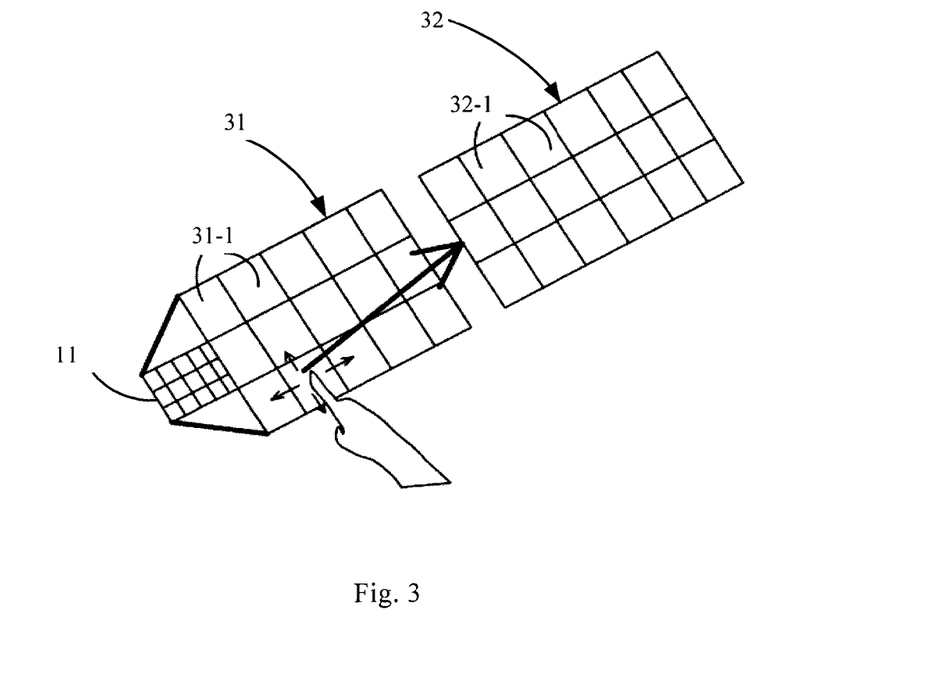
FIG. 3 is a schematic diagram of detecting an instruction input in a sliding manner by a user and displaying a target page by a mobile terminal according to embodiments of the disclosure.

In other embodiment, as shown in FIG. 3, the display unit 11 may display a primary menu 31 in a planar interface. When the user's finger slides in a region of the primary menu 31, the mobile terminal can determine motion trails of the user's finger so as to determine a sliding direction of the user's finger. If the current sliding direction of the user's finger corresponds to a page turning operation, a target page will be displayed, namely, the previous or next page 32 of the primary page 31. Similarly, the page 32 also includes a plurality of icons, an entire picture, and combination thereof. The page 32 may be a game picture and also an interface where a picture, a webpage, texts, a clock page, a navigation map and other applications to be browsed are operated.

Furthermore, the sliding direction of the user's finger may correspond to different orders, for example, the user's finger slides to the left and the right, which may be configured to correspond to page turning operations; the user's finger slides upwardly and downwardly, which may be configured to correspond to operations of backing to the previous menu and the main menu. Many configurations are not discussed in the description in detail.

Optionally, the planar interface may include, but not limited to, parallelogram, roundness, triangle, polygon and/or other planes pre-recorded by the mobile terminal.

Additionally, if a target page to be displayed is determined in accordance with the instruction input by the user and is not displayed in the solid graphical interface currently, the target page is displayed in a portion facing to the user currently within the solid graphical interface, alternatively, the target page is displayed in the solid graphical interface which is rotated so that the target page faces to the user in a circumstance that the displayed image is the preset-shaped solid graphical interface.

And, if a target page to be displayed is determined in accordance with the instruction input by the user and then displayed in the solid graphical interface currently, the solid graphical interface is rotated to face to the user in a circumstance that the displayed image is the preset-shaped solid graphical interface.

Optionally, the solid graphical interface may include, but not limited to, cube, sphere, solid triangle and/or other solid shapes (including irregular shapes) pre-recorded by the mobile terminal.

Taking a solid graphical interface of the cube for example, six surfaces of the cube may display different interfaces. For example, in an embodiment, under a condition that a page to be displayed is not displayed in the three-dimensional graphical interface, when the user's finger clicks an icon displayed on one surface where the page may display a plurality of icons/options, the next menu (i.e. the target page) the user will enter into after clicking the icon may be displayed in the current surface where the menu may display one or more instruction input box capable of receiving word and voice instructions input by the user. In another embodiment, when the user's finger clicks an icon displayed in one surface, the next menu the user will enter into after clicking the icon may be displayed in another surface, and the solid graphical interface is rotated so that the another surface where the next menu is displayed faces to the user.

For example, under a condition that the user clicks an icon A and a page X is the page to be displayed, if the page X is displayed on none of the six surface of the three-dimensional graphical interface, the page X is to be displayed on the surface where the icon A is positioned or other surface and thereby replace the originally displayed page.

Additionally, if the page to be displayed has been displayed in the three-dimensional graphical interface, the target page will be displayed by rotating the three-dimensional graphical interface.

In one embodiment, under a condition that the user clicks an icon B and a page Y is the page to be displayed, if the page Y has been displayed on the other surface of the three-dimensional graphical interface, the surface where the page Y is positioned faces to the user by rotating the three-dimensional graphical interface in response to the click executed by the user.

In another embodiment, the user can send an instruction for rotation of the three-dimensional graphical interface to rotate the three-dimensional graphical interface. In this case, when the user's finger slides in the graphical interface of the cube, the mobile terminal may determine a sliding direction of the user's finger (for example, the user's finger is detected to slide to the left and the right and slide upwardly and downwardly), and then the cube is rotated accordingly based on the directions. In an embodiment, if the plurality of surfaces of the cube can display a plurality of sub-pages in one menu, rotating the solid graphical interface of the cube is equal to execution of the page turning operation. In another embodiment, the plurality of surfaces of the cube displays not only a plurality of sub-pages in one menu but also the next or previous menu of the current menu. When the user's finger slides in the graphical interface of the cube and the solid graphical interface of the cube is rotated, both of the execution of the page turning operation and the execution of the back operation or the enter operation into the next menu are done. In another embodiment, the plurality of surfaces of the three-dimensional graphical interface are partially or completely configured to display the latest applications executed or latest pages browsed by the user.

Also, in some embodiments, the user can directly operate an icon displayed at each position within the solid graphical interface without rotation. In other embodiments, the mobile terminal may be preconfigured so that the mobile terminal merely identifies an operation to one or several portions in the solid graphical interface carried out by the user's finger, thereby avoiding error operation due to the larger size of the solid graphical interface.

Although the solid graphical interface of the cube is described, different-shaped solid graphical interfaces may be described similarly. For example, when the solid graphical interface is spherical, a spherical surface can be divided into several portions, wherein each portion is taken as a unit for displaying the primary menu or one page.

Furthermore, the mobile terminal according to embodiments of the disclosure further comprises an adjustment module (not shown) configured to regulate parameters of the displayed image, wherein the parameters include at least one of size, luminance, contrast ratio, shape and a distance from the image to the mobile terminal.

When the mobile terminal displays the planar interface, the user can operate to display the current contents in the solid graphical interface transferred from the planar interface; and the user may display the current contents in the planar interface transferred from the solid graphical interface, so that an image displayed in the solid graphical interface at any view is selected to be displayed in the planar interface. And, the transfers between different-shaped planar interfaces and different-shaped solid graphical interfaces may be implemented.

It means that the mobile terminal of the disclosure can transfer from the solid graphical interface to the planar interface. For example, when the user clicks one icon, or executes a page turning operation, or backs to the previous menu in the solid graphical interface, a target page to be entered may be a planar interface as needed; and when the user clicks one icon, or executes a page turning operation, or backs to the previous menu in the planar interface, a target page to be entered may be a solid graphical interface as needed.

In some embodiments, the size of the image displayed in 3D space and a distance between the image and the mobile terminal may be set by the adjustment module. For example, the size of the displayed image can be set to meet the user's requirement; and the distance between the displayed image and the mobile terminal may be also set.

In setting the size of the displayed image and the distance between the displayed image and the mobile terminal, the maximal/minimal size of the displayed image and the maximal/minimal distance between the displayed image and the mobile terminal both depend on performances of both the display unit and other components inside the mobile terminal, such as focal length of lens of the display unit, power consumption of the mobile terminal, and other factors. In some embodiments, the size of the image and the distance between the image and the mobile terminal may be set freely and may be set independently as well without departing from the scope of allowed performances of the mobile terminal.

Figure 4:
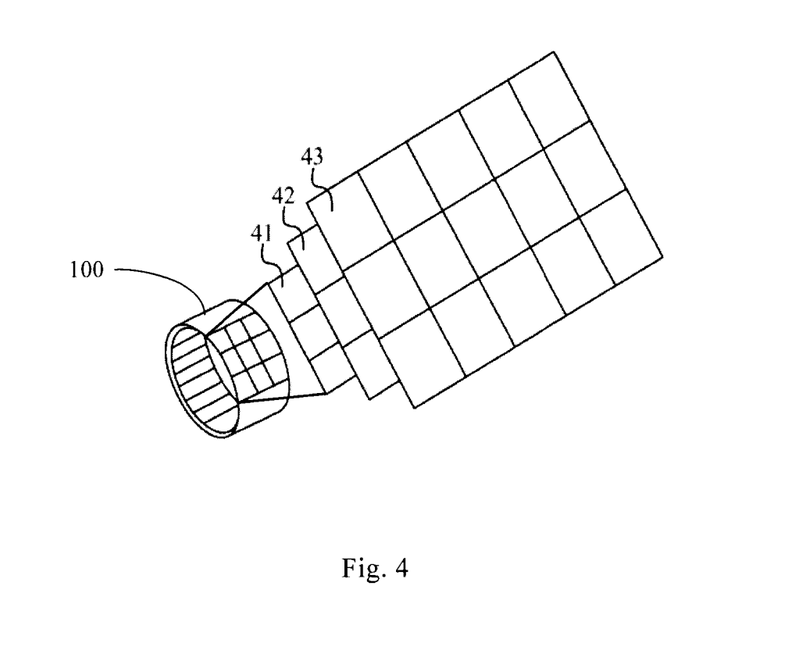
FIG. 4 is a schematic diagram of regulating a size and distance of a planar interface displayed in a 3D space by a mobile terminal according to embodiments of the disclosure.

In some embodiments, the size of the image may be scaled depending on the distance from the image to the mobile terminal. Optionally, in theses embodiments, the size of the image and the distance from the image to the mobile terminal can be preset at a plurality of levels for the user's selection. For example, refer to FIG. 4, the mobile terminal may display planar interfaces 41-43 in 3D space, and the size of the image is in direct proportion to the distance from the image to the mobile terminal. For example, the mobile terminal may display the planar interface 41 which has the minimal size and the closest distance from the mobile terminal; the mobile terminal also displays the planar interface 42 which has the size more than the size of the planar interface 41 and the distance from the mobile terminal more than the distance from the planar interface 41 to the mobile terminal; and the mobile terminal also displays the planer interface 43 which has the maximal size and the maximal distance from the mobile terminal.

Similarly, the size of the solid graphical interface is regulated, which is not discussed to avoid the repetition.

For example, in a practical application, an option required for the image displayed in the 3D space by the mobile terminal of the disclosure is selected in a 'Touch' operation manner, which may be realized by means of the determination module 12 having a distance measurement function to measure a 3D position of the user's finger in touch operation, the determination module 12 also comprising:

A detection sub-module (not shown) configured to detect spatial positions and/or motion trails of the finger in accordance with a distance between the finger and the mobile terminal; and A determination sub-module (not shown) configured to determine an object operated by the user in the displayed image in accordance with a detection result from the detection sub-module, and determining an instruction input by the user in accordance with the object operated by the user. Wherein, the determination sub-module is capable of determining the object operated by the user by detecting the distance between the spatial position of the user's finger or the motion trails of the user's finger and the target (for example, the icon) in the displayed image.

In some embodiments, the detection sub-module may have two or more than two cameras, each camera having a camera-shooting and/or picture-taking function for determining the positions and/or motion trails of the finger. In one embodiment, the two or more than two cameras can be closer to each other at positions of the mobile terminal. In another embodiment, the two or more than two cameras can be farther to each other at positions of the mobile terminal. The two or more than two cameras can be ensured to acquire the positions of the finger at different angles so that the exact positions of the finger can be determined, thereby determining the object operated by the user in the displayed image.

Additionally, the mobile terminal of the disclosure may detect the positions and/or motion trails of the finger by other technologies, for example, the detection sub-module may be a laser positioning/distance-measuring component, and components to implement respective functions may be arranged in the mobile terminal flexibly as needed.

The following description is made with reference to two cameras which are taken as the detection sub-module to determine the positions of the finger. A person skilled in the art should recognize that utilization of more cameras or further measurement of motion trails of the finger can be implemented by the similar principle or other principles.

Figure 5:
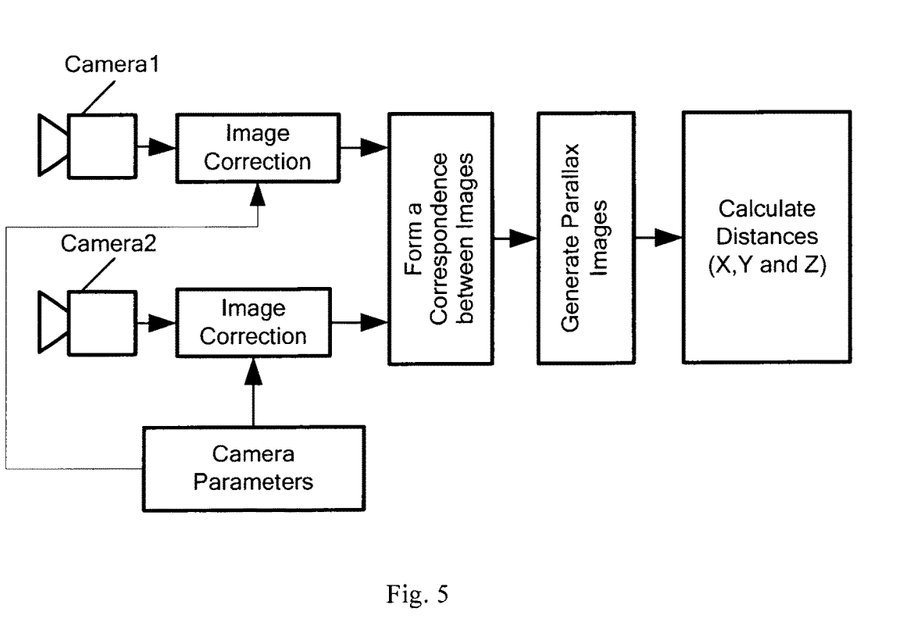
FIG. 5 is a schematic diagram of a process of distance measurement by a mobile terminal using two cameras according to embodiments of the disclosure.

FIG. 5 illustrates spatial position detection of the finger executing the touch operation in 3D space. Position information obtained by the detection may realize the correct 'Touch' operation in the 3D space.

There are many ways to measure 3D space positions (distances) of the finger in the touch operation. In FIG. 5, distance measurement is implemented by utilizing two cameras (i.e., camera 1 and camera 2; more than 2 cameras can be used in the practical applications), comprising the following steps:

Step 1, using camera parameters to correct images;

Step 2, forming a correspondence between the images;

Step 3, generating parallax images, for example, by a triangle method principle, which means that image planes of the two cameras and the object to be measured form a triangle and a position correspondence between the two cameras is known so that a 3D coordinate of feature points of the object to be measured in a shared field of view of the two cameras may be obtained, thereby achieving the measurement, namely, generation of the parallax images; and Step 4, calculating the distances (X, Y and Z).

Figure 6:
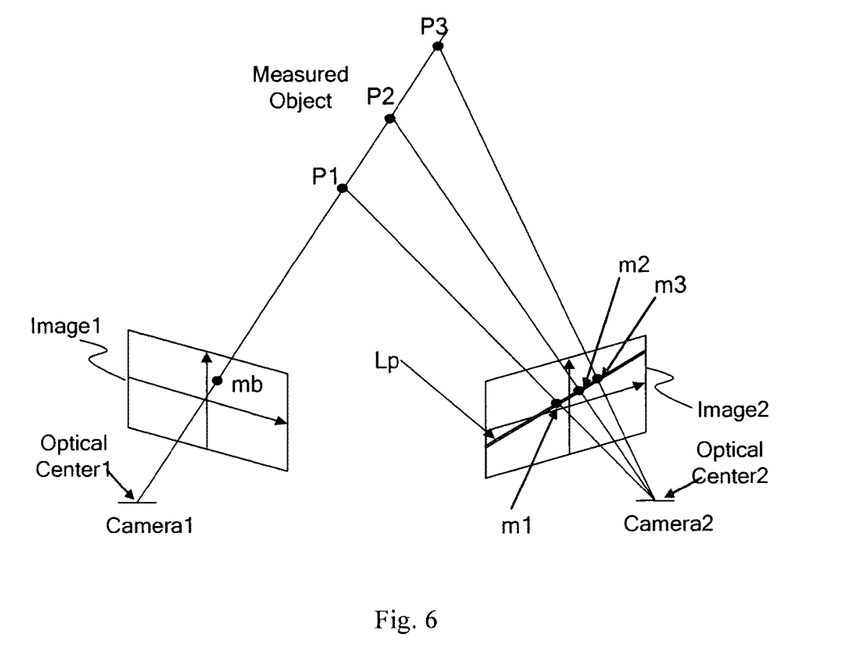
FIG. 6 is a schematic diagram of a principle of distance measurement by a mobile terminal using two cameras according to embodiments of the disclosure.

The following description is made with reference to manners to detect positions of target points by the two cameras. In FIG. 6, when the objects to be detected are positioned at P1, P2 and P3, respectively, the objects to be measured are always positioned at mb in an image 1 displayed in the camera 1 due to P1, P2, P3 and an optical center 1 of the camera 1 being in a line. However, P1, P2 and P3 as well as an optical center 2 of the camera 2 are out of the line, so the measured object at P1 is positioned at m1 in an image 2 acquired by the camera 2 according to the line between P1 and the optical center 2 when the camera 2 shoots the object at P1. Similarly, the measured object at P2 is positioned at m2 in an image 2 acquired by the camera 2 according to the line between P2 and the optical center 2, and the measured object at P3 is positioned at m3 in an image 2 acquired by the camera 2 according to the line between P3 and the optical center 2. Therefore, P1, P2 and P2 are in a line Lp for the camera 2, but each position point can be identified and determined clearly by combining the images acquired by the cameras 1 and 2. In other words, any position operated by the user can be determined. Specifically, an operation that a distance of the position of the finger away from one surface facing to the user in the planar interface or the three-dimensional interface is less than a threshold is considered as an operation of the user on the current interface.

The utilization of more cameras and the acquisition of motion trails of the user's finger by the cameras can be implemented by the similar principles.

Furthermore, the display unit 11, the determination module 12 and the processing module 13 included in the mobile terminal of the disclosure are arranged at the main body thereof. The mobile terminal according to the embodiments of the disclosure further comprises a wearing portion connected with the main body and configured to wear the mobile terminal for the user.

In an embodiment, the mobile terminal according to the embodiments of the disclosure may be a watch-type mobile terminal.

Figure 7:
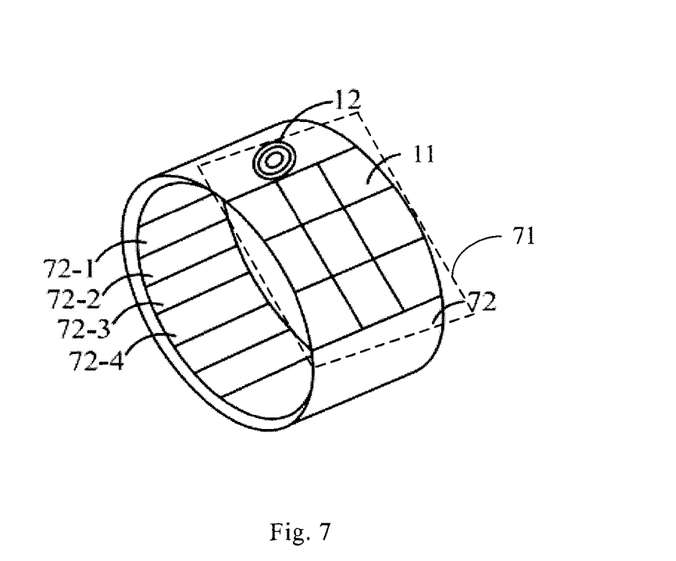
FIG. 7 is a schematic diagram of a watch-type mobile terminal according to embodiments of the disclosure.

FIG. 7 illustrates a watch-type mobile terminal comprising:

A main body 71 (shown by a dashed frame in FIG. 7) which may include a display unit 11 configured to display an image to be displayed in 3D space beyond the mobile terminal, a determination module configured to determine an instruction input by the user according to the displayed image through spatial position detection, and a processing module (not shown) configured to execute an operation corresponding to the determined instruction; and A fixing band 72 corresponding to the wearing portion has a watch band shape in the watch-type mobile terminal, which is connected with the main body 71 and configured to fix the mobile terminal on a user's limb so that the user can wear the mobile terminal, as shown in FIG. 7.

Additionally, in an embodiment, the determination module 12 in FIG. 7 also includes the detection sub-module, wherein the detection sub-module may be equipped with two or more than two cameras, each having a camera-shooting and/or picture-taking function for determination of positions and/or motion trails of the finger. In an embodiment, two or more than two cameras may be arranged at a position where the determination module 12 is positioned, as shown in FIG. 7. The two or more than two cameras are ensured not to be overlapped so that detection for the positions and/or motion trails of the finger can be implemented. In another embodiment, the two or more than two cameras can be arranged at a farther distance. In yet another embodiment, the detection sub-module may be a laser positioning/distance-measuring component. In other embodiment, the detection sub-module may be also other positioning/distance-measuring component; furthermore, any component for detecting the finger can be arranged flexibly as needed, for example, a plurality of cameras can be arranged at four corners of the display unit 11. No description to each component and the position thereof is made herein.

Additionally, the watch-type mobile terminal may comprise batteries, wherein the batteries may be arranged in the fixing band 72 for supplying powers for the mobile terminal and are connected with the main body 71.

In another embodiment, for example, refer to FIG. 7, the fixing band 72 can be divided into a plurality of sections 71-1, 72-2, 72-3, 72-4 . . . , wherein the sections and/or the sections and the main body 71 may be hinged, and the sections are equipped with the batteries partially or overall. The batteries are embedded into the respective sections, which is not discussed herein.

In other embodiments, the different-shaped batteries may be also arranged in the fixing band 72 in other ways so that the batteries and the fixing band may be embedded integrally or less sectionally. The fixing band 72 has a variable shape and the batteries therein also have variable shapes.

The batteries are arranged in the fixing band 72 partially or completely, thereby supplying power for the mobile terminal and avoiding increment of the volume and weight of the mobile terminal for convenience for the user.

In other embodiment, the mobile terminal according to the embodiments of the disclosure may be a pendant type mobile terminal with a rope-shaped wearing portion. The batteries can be arranged in the fixing band, the main body, or both thereof for any type mobile terminal. Wherein, the rope-shaped wearing portion may be connected to the fixing band. Moreover, the material the rope-shaped wearing portion is made of may select from a group consisting of nylon, plastics and metal. The rope-shaped wearing portion may be catenarian, linear (with a columnar cross section) or banded.

Additionally, the mobile terminal according to embodiments of the disclosure further comprises a trigger key (not shown) for generating a trigger instruction when being pressed, and the display unit 11 configured to make responses to the trigger instruction and displaying the image to be displayed in 3D space beyond the mobile terminal. In the examples of the present invention, the trigger key may be a physical key or a virtual key on the displayer.

The display unit stops displaying the image in the 3D space if the trigger key is pressed again, or the user does not input the instruction by the displayed image in a preset period during displaying the image to be displayed in 3D space beyond the mobile terminal. Optionally, the user may also click other key, for example, a virtual key arranged on the interface displayed in the 3D space, to stop displaying the image therein.

Furthermore, the mobile terminal is a mobile communication terminal or a multimedia player.

Optionally, the mobile communication terminal refers to any communication terminal with an information receiving-sending function, which may comprise, but not limited to, a mobile phone, a navigation device, a tablet PC, a PDA and a smart watch, etc.

Optionally, the multimedia player may comprise, but not limited to, a picture player, an audio player, a video player, a text player and a game machine, etc. Additionally, the multimedia player is also equipped with a network communication function.

For the above, by means of the technical solutions of the disclosure both displaying the image in the 3D space beyond the mobile terminal and the spatial position detection are beneficial to exactly execute the operation corresponding to the user's instruction, so that the user can observe the image conveniently, the limitation of a screen size is eliminated, the instruction from the user can be judged and executed accurately, and user experience is improved. Also, the trigger key is arranged to further enrich the functions of the mobile terminal itself for convenience for the user; and the batteries of the mobile terminal are arranged in the fixing band so that the mobile terminal can be compacter and more beautiful, and is taken and used conveniently by the user without influences on the performances.

A non-transient storage medium is provided according to another aspect of the disclosure, having embodied thereon a computer program configured to make a processor to execute an operation according to an instruction input by a user through the displayed image, the computer program comprising code segments configured to cause a processor to: determining an instruction input by the user through the displayed image via spatial position detection, wherein the image is displayed in a three-dimensional space beyond the mobile terminal; and executing an operation corresponding to the determined instruction.

The basic principles of the disclosure is discussed with respect to the embodiments, however, it is noted that a person skilled in the art should appreciate from the disclosure all or any of the steps or features of the methods and devices of the disclosure and may implement the same in any calculating device (such as a processor, a storage medium, etc.) or calculating device network by hardware, firmware, software or the combination thereof by applying their basic programming skills.

Therefore, the disclosure may be implemented by running a program or one group of programs in any calculating device. The calculating device may be the publicly known device. The invention may be implemented by merely providing a program product containing program codes for realizing the methods or devices. In other words, such program product constitutes the disclosure, and a storage medium in which such program product is stored also constitutes the disclosure. Obviously, the storage medium may be any storage medium which is well known or will be developed in the future.

Figure 8:
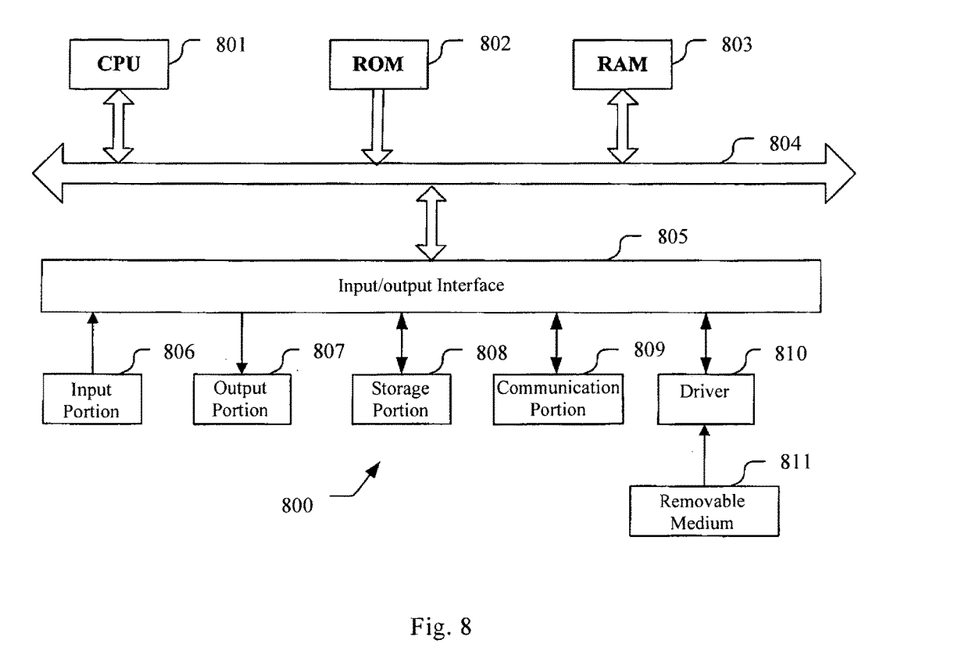
FIG. 8 is an illustrative structure diagram of a computer for realizing the technical solution of the disclosure.

In a circumstance that the embodiments of the disclosure are realized by software and/or firmware, program constituting the software are installed in a computer with a special hardware structure, for example, a common computer 800 shown in FIG. 8, by the storage medium or network. The computer equipped with the program can execute different functions.

Refer to FIG. 8, a central processing unit (CPU) 801 executes different operations according to a program stored in a read-only memory (ROM) 802 or a program loaded in a random access memory (RAM) 803 from a storage portion 808. The RAM 803 also stores data required for the different operations executed by the CPU 801. The CPU 801, the ROM 802 and the RAM 803 are connected mutually by a bus 804. An input/output interface 805 is also connected to the bus 804.

An input portion 806 including a keyboard, a mouse and the like, an output portion 807 including a display (such as a cathode-ray tube (CRT) display, a liquid-crystal display (LCD) and the like) and a loudspeaker, etc., the storage portion 808 including a hard disk, etc. and a communication portion 809 including a network interface card such as an LAN card and a modulator-demodulator, etc. are connected to the input/output interface 805. The communication portion 809 runs a communication operation by a network such as Internet.

A driver 810 is connected to the input/output interface 805 as needed. A removable medium 811 such as a disc, an optical disc, a magnetic optical disc, a semiconductor memory and the like are installed in the driver 810 as needed, such that a computer program read from the driver 810 is installed in the storage portion 808 as needed.

When the software is used to realize the processing operations, a program constituting the software is installed by the network such as Internet or the storage medium such as the removable medium 811.

A person skilled in the art should understand that the storage medium includes, but not limited to, the removable medium 811 storing the program and providing programs for users in separation from the device, as shown in FIG. 8. The removable medium 811 includes a disc (including a floppy disk (registered trademark)), an optical disc (including a compact disk read only memory (CD-ROM) and a digital video disk (DVD)), a magnetic optical disc (including minidisc (MD) (registered trademark)) and a semiconductor memory. Or, the storage medium may be discs and the like included in the ROM 802 and the storage portion 808, wherein the discs stores the programs and are distributed to the users with the devices containing the same.

It is should be noted that the features or steps can be split and/or recombined in the devices and methods of the disclosure. Such splitting and/or recombination are deemed to be equivalents. Moreover, the steps can be performed in time order described naturally, but they are not necessarily required. Some steps can be performed in parallel or independently.

Although the disclosure and advantages thereof have been described in detail, it should be understood that various changes, substitutions and alterations can be made herein without departing from the spirit and scope of the disclosure. Moreover, the terms, such as 'comprise', 'composed of' or other nonexclusive derivatives are used in the invention, such that the process, method, product or device comprises not only a series of factors but also other factors not described definitely, or inherent factors thereof. Without more limitations, the wording 'comprising one . . . ' defines one factor, but other same factors may be comprised in the process, method, product or device.

The invention claimed is:

1. A mobile terminal, comprising:
   a display configured to display an image in a three-dimensional space; and circuitry configured to
   determine a spatial position or a motion trail of an object in the three-dimensional space based on plural images of the object obtained by two or more cameras included in the mobile terminal,
   determine a graphic element in the displayed image that is operated by the user in accordance with the determined spatial position and/or motion trials of the object,
   determine an instruction input by a user based on the spatial position or the motion trail of the object in the three-dimensional space, and
   execute an operation corresponding to the determined instruction, wherein the display and the circuitry are arranged in a main body of the mobile terminal the mobile terminal further comprising a wearing part, connected to the main body and configured to attach the main body to the user, the mobile terminal is a watch-type mobile terminal, and the wearing part has a watch band shape and is configured to fix the mobile terminal on a user's limb, or the mobile terminal is a pendant type mobile terminal, and the wearing part has a rope shape.

2. The mobile terminal of claim 1, wherein the image displayed by the display comprises at least one of a preset-shaped planar interface and a preset-shaped three-dimensional graphical interface.

3. The mobile terminal of claim 2, wherein the operation corresponding to the determined instruction includes displaying a target page in the preset-shaped planar interface in a circumstance that the displayed image is the preset-shaped planar interface.

4. The mobile terminal of claim 2, wherein the operation corresponding to the determined instruction includes displaying a target page in a portion of the preset-shaped three-dimensional graphical interface facing the in a circumstance that the displayed image is the preset-shaped three-dimensional graphical interface.

5. The mobile terminal of claim 2, wherein the operation corresponding to the determined instruction includes rotating a target page to a portion of the preset-shaped three-dimensional graphical interface facing the user when the target page is displayed in the preset-shaped three-dimensional graphical interface prior to executing the operation in a circumstance that the displayed image is the preset-shaped three-dimensional graphical interface.

6. The mobile terminal of claim 2, wherein the preset-shaped planar interface comprises at least one of a parallelogram, roundness, triangle, and polygon shape.

7. The mobile terminal of claim 2, wherein the preset-shaped three-dimensional graphical interface comprises at least one of a cube, sphere, and solid triangle shape.

8. The mobile terminal of claim 1, wherein the circuitry is further configured to regulate parameters of the displayed image, wherein the parameters comprise at least one of size, luminance, contrast ratio, shape, and a distance between the image and the mobile terminal in the three-dimensional space.

9. The mobile terminal of claim 1, wherein the circuitry is further configured to
   detect spatial positions and/or motion trails of a user's finger in accordance with a distance between the user's finger and the mobile terminal,
   determine the instruction input by the user in accordance with the graphic element operated by the user.

10. The mobile terminal of claim 1, further comprising at least one battery disposed in the wearing part, the at least one battery being configured to supply power for the mobile terminal and electrically connected to the main body.

11. The mobile terminal of claim 1, wherein the wearing part is divided into a plurality of sections, and wherein the plurality of sections and/or a part of the plurality of sections and the main body are hinged respectively, and one or more sections of the plurality of sections are equipped with respective batteries of the at least one battery.

12. The mobile terminal of claim 1, wherein the display is configured to display the image by means of Light Re-construction Technology.

13. The mobile terminal of claim 1, further comprising;
    a trigger key configured to generate a trigger instruction under a condition of pressing the trigger key,
    wherein the display is configured to display the image in the three-dimensional space in response to the trigger instruction.

14. The mobile terminal of claim 13, wherein the display stops displaying the image in the three-dimensional space if the trigger key is pressed again, or the user does not input an instruction through the displayed image after the image is displayed in the three-dimensional space for a predetermined period.

15. The mobile terminal of claim 1, wherein the mobile terminal is a mobile communication terminal or a multimedia player.

16. A watch-type mobile terminal, comprising; a main body, comprising;
    a display configured to display an image in a three-dimensional space; and circuitry configured to
    determine a spatial position or a motion trail of an object in the three-dimensional space based on plural images of the object obtained by two or more cameras included in the watch-type mobile terminal,
    determine a graphic element in the displayed image that is operated by the user in accordance with the determined spatial position and/or motion trials of the object,
    determine an instruction input by a user based on the spatial position or the motion trail of the object in the three-dimensional space, and
    execute an operation corresponding to the determined instruction; and a fixing band, connected to the main body of the watch-type mobile terminal and configured to attach the main body to the user's limb.

17. The watch-type mobile terminal of claim 16, further comprising at least one battery disposed in the fixing band, the at least one battery being configured to supply power for the watch-type mobile terminal and electrically connected to the main body.

18. A non-transient storage medium, having embodied thereon a computer program, the computer program comprising code segments configured to cause a processor of a mobile terminal to perform a method comprising:
- displaying an image in a three-dimensional space by a display
- determining, by circuitry, a spatial position or a motion trail of an object in the three-dimensional space based on plural images of the object obtained by two or more cameras,
- determining a graphic element in the displayed image that is operated by the user in accordance with the determined spatial position and/or motion trials of the object,
- determining, by the circuitry, an instruction input by a user based on the spatial position or the motion trial of the object in the three-dimensional; and
- executing an operation corresponding to the determined instruction, wherein the display and the circuitry are arranged in a main body of the mobile terminal, the mobile terminal further comprising a wearing part, connected to the main body and configured to attach the main body to the user, the mobile terminal is a watch-type mobile terminal, and the wearing part has a watch band shape and is configured to fix the mobile terminal on a user's limb, or the mobile terminal is a pendant type mobile terminal, and the wearing part has a rope shape.

* * * * *